(12) United States Patent
Eng et al.

(10) Patent No.: US 11,140,216 B2
(45) Date of Patent: Oct. 5, 2021

(54) DYNAMICALLY PROVIDING HOST INPUT CONTROL FOR STREAMING APPLICATIONS

(71) Applicant: Nvidia Corporation, Santa Clara, CA (US)

(72) Inventors: David Eng, Santa Clara, CA (US); Rajesh Medisetty, Hyderabad (IN); Amit Chaudhary, Hyderabad (IN); Rahil Dhru, Pune (IN)

(73) Assignee: Nvidia Corporation, Santa Clara, CA (US)

(*) Notice: Subject to any disclaimer, the term of this patent is extended or adjusted under 35 U.S.C. 154(b) by 142 days.

(21) Appl. No.: 16/680,702

(22) Filed: Nov. 12, 2019

(65) Prior Publication Data
US 2020/0084266 A1  Mar. 12, 2020

Related U.S. Application Data

(63) Continuation of application No. 14/844,907, filed on Sep. 3, 2015, now Pat. No. 10,484,459.

(51) Int. Cl.
| | |
|---|---|
| *H04L 29/08* | (2006.01) |
| *G06F 3/0488* | (2013.01) |
| *H04N 21/4788* | (2011.01) |
| *H04N 21/845* | (2011.01) |
| *H04N 21/4402* | (2011.01) |
| *H04N 21/2387* | (2011.01) |

(52) U.S. Cl.
CPC .......... *H04L 67/10* (2013.01); *G06F 3/04886* (2013.01); *H04L 67/141* (2013.01); *H04N 21/2387* (2013.01); *H04N 21/4402* (2013.01); *H04N 21/4788* (2013.01); *H04N 21/8456* (2013.01)

(58) Field of Classification Search
CPC .... H04L 67/10; H04L 67/141; G06F 3/04886
See application file for complete search history.

(56) References Cited

U.S. PATENT DOCUMENTS

| | | | | |
|---|---|---|---|---|
| 6,370,573 | B1 * | 4/2002 | Bowman-Amuah | G06F 8/20 709/223 |
| 7,406,525 | B2 * | 7/2008 | Higgins | H04L 29/06 709/223 |

(Continued)

*Primary Examiner* — Philip J Chea
*Assistant Examiner* — Wuji Chen

(57) ABSTRACT

A computer streaming system includes a remote user device and a host streaming unit. The host streaming unit determines input methods suitable for the remote user device to interact with content streamed to the remote user using a selected application. The host streaming unit detects whether a user interface of the selected application is supported by the remote user device and dynamically institutes emulated native input support for the remote user device when the host streaming unit detects the user interface of the selected application is not supported by the remote user device. Additionally, the host streaming unit dynamically dismisses emulated native input support for the remote user device when the host streaming unit detects the user interface of the selected application is supported by the remote user device, causing the remote user device to return to native input control. Also provided is a method of streaming a computer application.

20 Claims, 8 Drawing Sheets

(56) References Cited

U.S. PATENT DOCUMENTS

| | | | |
|---|---|---|---|
| 7,908,380 B1* | 3/2011 | Chu | H04L 12/6418 709/222 |
| 8,819,617 B1* | 8/2014 | Koenig | G06F 8/70 717/101 |
| 8,977,987 B1 | 3/2015 | Korn et al. | |
| 8,998,707 B2 | 4/2015 | Arnone et al. | |
| 9,609,380 B2 | 3/2017 | Laska et al. | |
| 2002/0065912 A1* | 5/2002 | Catchpole | G06F 17/30873 709/224 |
| 2003/0131342 A1* | 7/2003 | Bates | G06F 8/71 717/125 |
| 2005/0015601 A1* | 1/2005 | Tabi | G06F 21/6227 713/182 |
| 2006/0234791 A1 | 10/2006 | Nguyen et al. | |
| 2006/0294106 A1* | 12/2006 | Frieden | G06F 17/30873 |
| 2007/0180449 A1* | 8/2007 | Croft | G06F 3/1415 718/1 |
| 2007/0245259 A1 | 10/2007 | Carlson | |
| 2007/0283321 A1* | 12/2007 | Hegde | G06F 8/71 717/110 |
| 2008/0001927 A1 | 1/2008 | Yoshida | |
| 2008/0001928 A1 | 1/2008 | Yoshida | |
| 2008/0005235 A1* | 1/2008 | Hegde | G06Q 10/10 709/204 |
| 2008/0109790 A1* | 5/2008 | Farnham | G06F 8/71 717/128 |
| 2008/0120599 A1* | 5/2008 | I'Anson | H04L 41/5054 717/120 |
| 2008/0155104 A1* | 6/2008 | Quinn | H04L 12/1827 709/227 |
| 2008/0178154 A1* | 7/2008 | Basler | G06F 8/20 717/124 |
| 2009/0037452 A1* | 2/2009 | Baitalmal | G06F 17/30575 |
| 2009/0132579 A1* | 5/2009 | Kwang | H04L 67/22 |
| 2009/0276771 A1* | 11/2009 | Nickolov | G06F 9/4856 717/177 |
| 2010/0087241 A1 | 4/2010 | Nguyen et al. | |
| 2010/0262925 A1* | 10/2010 | Liu | G06Q 10/10 715/759 |
| 2010/0251458 A1 | 11/2010 | Paladino et al. | |
| 2010/0281458 A1* | 11/2010 | Paladino | G06F 8/71 717/106 |
| 2010/0306676 A1* | 12/2010 | Srinivasaraghavan | G06Q 10/10 715/758 |
| 2011/0173235 A1* | 7/2011 | Aman | A63B 24/0021 707/792 |
| 2011/0191746 A1* | 8/2011 | Packbier | G06F 9/44 717/103 |
| 2011/0252093 A1* | 10/2011 | Spataro | G06F 17/30011 709/204 |
| 2011/0281622 A1 | 11/2011 | Ryu | |
| 2011/0314093 A1 | 12/2011 | Sheu et al. | |
| 2012/0169610 A1 | 7/2012 | Berkes et al. | |
| 2012/0246170 A1* | 9/2012 | Iantorno | G06F 11/3672 707/748 |
| 2012/0309515 A1 | 12/2012 | Chung et al. | |
| 2012/0311522 A1* | 12/2012 | Perisic | G06F 8/71 717/102 |
| 2012/0315977 A1 | 12/2012 | Asami | |
| 2013/0006734 A1 | 1/2013 | Ocko et al. | |
| 2013/0014023 A1* | 1/2013 | Lee | G06Q 10/103 715/751 |
| 2013/0091205 A1* | 4/2013 | Kotler | H04L 65/4015 709/204 |
| 2013/0170813 A1 | 7/2013 | Woods et al. | |
| 2013/0190083 A1 | 7/2013 | Toy et al. | |
| 2013/0274018 A1 | 10/2013 | Zalewski | |
| 2013/0316772 A1 | 11/2013 | Kong | |
| 2013/0324242 A1 | 12/2013 | Vincent et al. | |
| 2014/0351574 A1* | 11/2014 | Grab | G06F 21/10 713/155 |
| 2015/0007055 A1* | 1/2015 | Lemus | G06F 3/0484 715/753 |
| 2015/0039421 A1 | 2/2015 | Ford et al. | |
| 2015/0149929 A1* | 5/2015 | Shepherd | H04L 65/403 715/753 |
| 2015/0181289 A1 | 6/2015 | Wheatley | |
| 2015/0189368 A1 | 7/2015 | Lee et al. | |
| 2016/0070777 A1* | 3/2016 | Lubeck | G06F 17/30867 707/740 |
| 2016/0092737 A1 | 3/2016 | Laska et al. | |
| 2016/0171835 A1 | 6/2016 | Washington et al. | |
| 2016/0283106 A1 | 9/2016 | Thorne | |
| 2016/0292956 A1 | 10/2016 | Greenbaum et al. | |
| 2016/0360259 A1 | 12/2016 | Hashimoto et al. | |
| 2017/0018002 A1 | 1/2017 | Champy | |
| 2017/0021270 A1 | 1/2017 | Wang et al. | |
| 2017/0312626 A1 | 11/2017 | Colenbrander | |
| 2017/0354884 A1 | 12/2017 | Benedetto et al. | |
| 2017/0357441 A1 | 12/2017 | Sanciangco et al. | |

* cited by examiner

DYNAMICALLY PROVIDING HOST INPUT CONTROL FOR STREAMING APPLICATIONS

CROSS-REFERENCE TO RELATED APPLICATION

This application is a continuation of U.S. patent application Ser. No. 14/844,907, entitled "DYNAMICALLY PROVIDING HOST INPUT CONTROL FOR STREAMING APPLICATIONS", filed on Sep. 3, 2015 and to be issued as U.S. Pat. No. 10,484,459 on Nov. 19, 2019. The above-listed application is commonly assigned with the present application is incorporated herein by reference as if reproduced herein in its entirety.

TECHNICAL FIELD

This application is directed, in general, to computer application processing and, more specifically, to a computer streaming system and a method of streaming a computer application.

BACKGROUND

When using a device to display application content that has been streamed from another device, a required input capability to respond to some content may not be available for a user. For example, streaming a personal computer game that supports a controller may still require keyboard and mouse input for uncommon scenarios such as error dialogs, third party software overlays (e.g., a publisher's social overlay for user information) or text entry for saving games or in-game content creation, for example. When a user encounters these unanticipated streaming situations, the experience provided usually deteriorates as their progress is halted. They find themselves powerless to provide the requested information given their current device's inability to provide a proper input. Therefore, what is needed in the art is an enhanced way to provide the needed information.

SUMMARY

Embodiments of the present disclosure provide a computer streaming system and a method of streaming a computer application.

In one embodiment, the computer streaming system includes a remote user device and a host streaming unit. The host streaming unit determines one or more input methods suitable for the remote user device to interact with content being streamed using a selected application to the remote user. Additionally, the host streaming unit detects whether a user interface of the selected application is supported by the remote user device. The host streaming unit dynamically institutes emulated native input support for the remote user device when the host streaming unit detects that the user interface of the selected application is not supported by the remote user device. Additionally, the host streaming unit dynamically dismisses the emulated native input support for the remote user device when the host streaming unit detects that the user interface of the selected application is supported by the remote user device, causing the remote user device to return to native input control.

In another aspect, the method of streaming a computer application includes determining, by a host streaming unit, one or more input methods suitable for a remote user device for content being streamed in the computer application to the remote user device. The method also includes detecting, by the host streaming unit, whether a user interface of the computer application is supported by the remote user device. Additionally, the method includes dynamically instituting emulated native input support for the remote user device by the host streaming unit when the host streaming unit detects that remote user device does not support the user interface of the computer application. The method also includes dynamically dismissing the emulated native input support for the remote user device by the host streaming unit when the host streaming unit detects that the remote user device supports the user interface of the computer application, causing the remote user device to return to native input control.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

Reference is now made to the following descriptions taken in conjunction with the accompanying drawings, in which.

DETAILED DESCRIPTION

Embodiments of the present disclosure are generally directed toward streaming of a computer application from an initiating device to a remote user device employing an interconnecting network. These embodiments detect when information input capabilities for the remote user device are not sufficient for a host application's current user interface.

For example, embodiments of the present disclosure detect when a dialog between host and a remote device requires mouse and keyboard operations that are not supported by an existing controller input (e.g., information request pops-ups). Once detected, a required emulated native support is dynamically provided for the remote device. For example, providing a joystick controlled mouse and on-screen keyboard that can be used by the remote user device as a controller input capability.

Once the user interface changes (e.g., the dialog is closed) and the embodiments detect that the streaming application's user interface is able to properly handle the remote device's input, the emulated native support for the input devices is dismissed, and the user is returned to a native input control.

Figure 1:
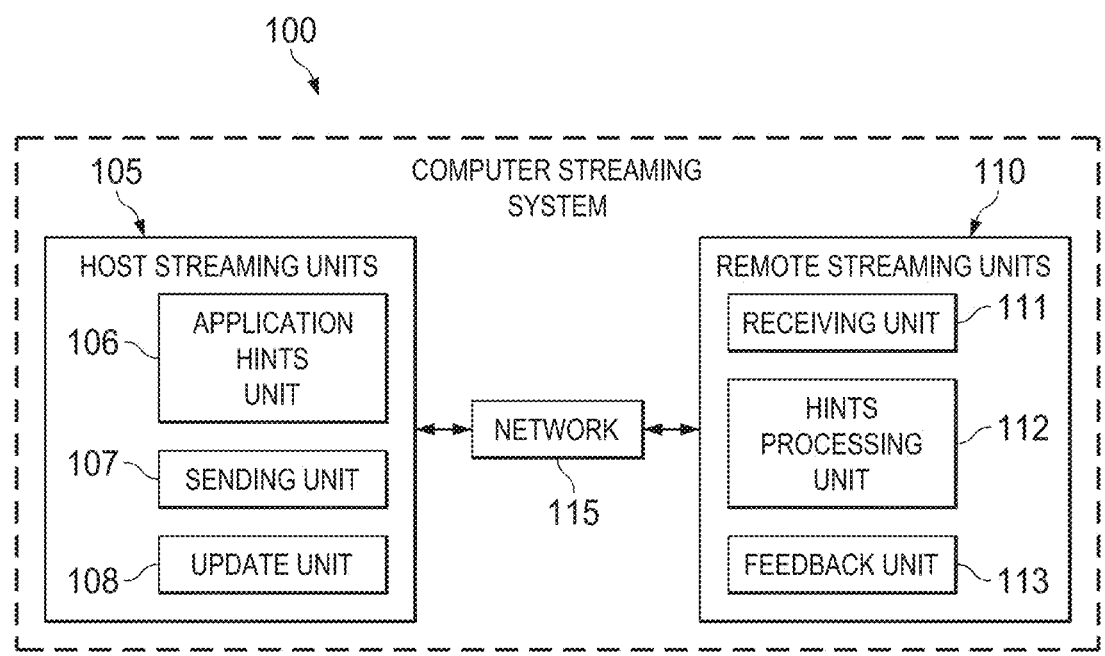
FIG. 1 illustrates an embodiment of a computer streaming system constructed according to the principles of the present disclosure.

FIG. 1 illustrates an embodiment of a computer streaming system, generally designated 100, constructed according to the principles of the present disclosure. The computer streaming system 100 includes host streaming units 105, remote streaming units 110, and a network 115 that connects the two. In the illustrated embodiment, the host streaming units 105 include an application hints unit 106, a sending unit 107, and an update unit 108. The remote streaming units 110 include a receiving unit 111, a hints processing unit 112, and a feedback unit 113.

The application hints unit 106 is coupled to a streaming device to provide an advisory hint for a remote user device corresponding to a selected streaming application. The sending unit 107 is coupled to the application hints unit 106 to manage streaming of the advisory hint and the selected streaming application over the network 115, which is also connected to the remote user device. The receiving unit 111 is coupled to the network 115 to recover the advisory hint for the remote user device. The hints processing unit 112 is coupled to the receiving unit 111 to apply the advisory hint to the remote user device when employing the selected computer application.

The feedback unit 113 is coupled to the remote user device to provide remote user feedback information over the network 115 directed to responding to the advisory hint. The update unit 108 is coupled to the streaming device to provide the remote user feedback information. The streaming device generally includes a local user device or a cloud server.

In embodiments of this disclosure, the streaming device operates as a streaming host to the remote user device, which operates as a streaming client. Here, the host streaming device sends computer applications to the remote user device for processing and display there. Additionally, the streaming device provides information as to a state of the selected computer application in the form of the advisory hint, which supplies needed direction to the remote user device for its use in processing the selected computer application. The advisory hint makes the remote user device aware of a special processing requirement for the selected computer application.

For example, through detection of controller queries conducted by the application process or inspection of actual user interface elements, the host streaming device can determine what input methods are suitable for the content being streamed. Then, the host streaming device can request these from the remote user device in the form of an appropriate advisory hint.

For example, the remote user device can receive these advisory hints from the streaming device to show an on-screen keyboard that will pass keyboard events through to the host streaming device in the form of feedback information. Additionally, a joystick may be switched from sending joystick events to controlling a mouse position of the streaming device, thereby allowing the user to provide movement and selection functions (e.g., "clicking") to comfortably operate a mouse from the joystick. This also may be accomplished through use of a virtual keystroke.

The controller for the remote user device may be mapped to keyboard or mouse events that give a user controller-like command over a dialog, which on the host streaming device, does not natively take controller input.

The remote user device may be switched away from displaying the streaming video to display a specific, native user input interface, such as a login user interface for a DRM (Digital Rights Management) application. This provides a more optimal user experience for interaction by abstracting away activities that otherwise would interfere with gameplay, for example. Additionally, the remote user device can enable a mode where a user can zoom in and zoom out of the streaming video, so that large dialogs and text can be made readable. This feature may be combined with using other input approaches described above to interact with the dialog.

Figure 2:
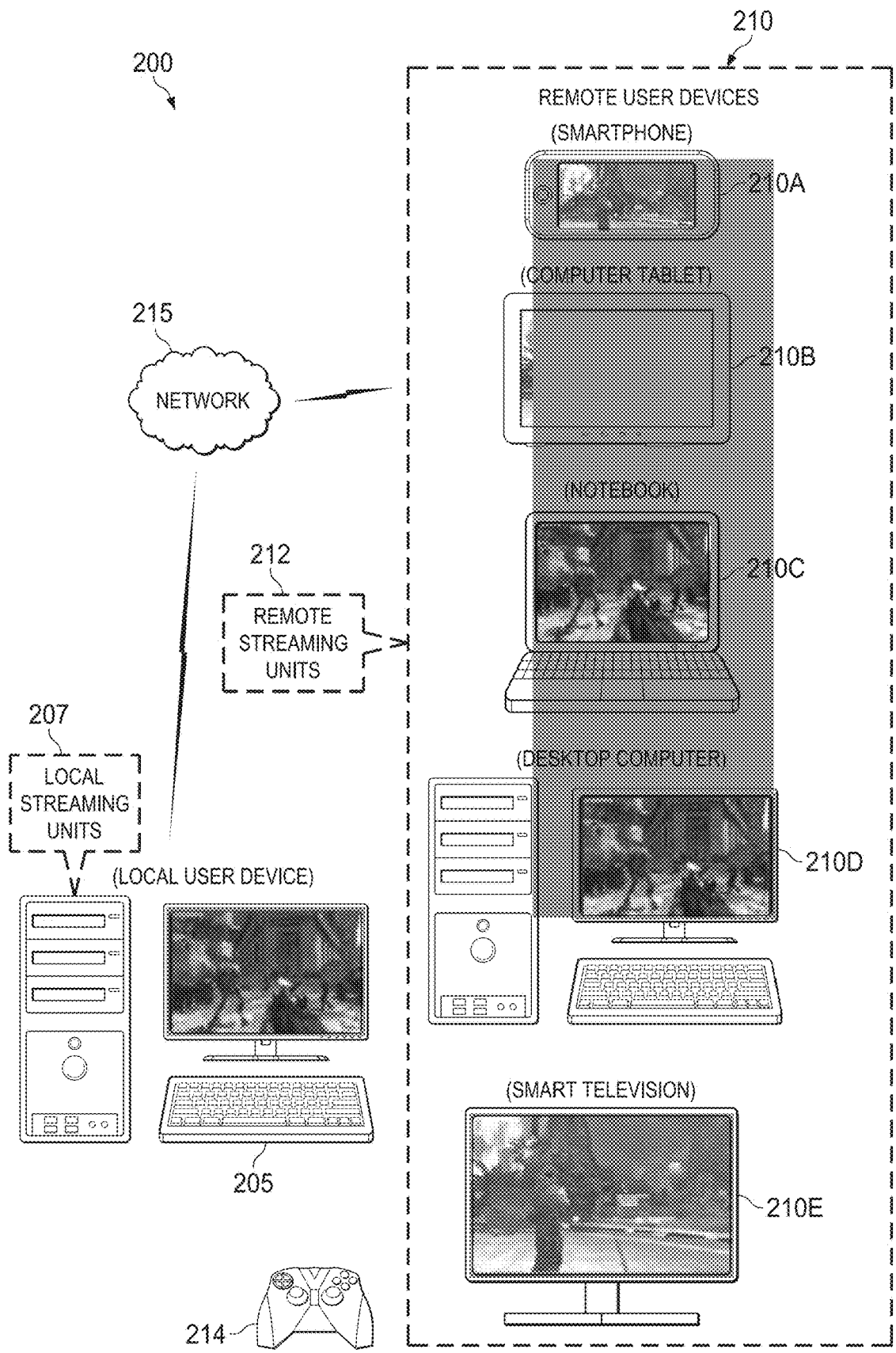
FIG. 2 illustrates a local user device streaming arrangement employing a computer streaming system and constructed according to the principles of the present disclosure.

FIG. 2 illustrates a local user device streaming arrangement, generally designated 200, employing a computer streaming system and constructed according to the principles of the present disclosure. The local user device streaming arrangement 200 is typically employed to transfer viewing of a computer application from a local computing device to a remote computing or display device. The streaming arrangement 200 includes a local user device 205, examples of remote user devices 210, and a network 215 connecting the two, as shown.

In the illustrated embodiment, the local user device 205 is a desktop computer that provides a general purpose computing capability. In this example, the remote user devices 210 include a smartphone 210A, a computer tablet 210B, a notebook computer 210C, a desk top computer 210D, and a smart television 210E, as an example of a living room device. A controller 214 may be employed to facilitate operation of at least a portion of the remote user devices 210 (e.g., the computer tablet 210B and the smart television 210E).

The network 215 is representative of a public or private network that supports communication between the local and remote user devices 205, 210. The network 215 may employ wireless or wireline connections and generally may include the Internet, a cellular communications network or a WI-FI network, for example.

The streaming arrangement 200 also has a computer streaming system, which includes local streaming units 207 and remote streaming units 212 that employ the network 215. In the illustrated embodiment, the local streaming units 207 are coupled to the local user device 205, and the remote streaming units 212 are coupled to the remote user devices 210. Generally, the local streaming units 207 include application hints and sending units, and typically include update units. Correspondingly, the remote streaming units 212 generally include receiving and hints processing units and typically include feedback units.

In the embodiment illustrated, the local streaming units 207 may be included within the local user device 205 and may generally consist of software or hardware portions. Similarly, the remote streaming units 212 may be included within the remote user devices 210 and may generally consist of software or hardware portions, as well. In other embodiments, the local streaming units 207 or the remote streaming units 212 may be implemented separately from the local user device 205 or the remote user devices 210, respectively. Operation of the computer streaming system included in the streaming arrangement 200 parallels that of the computer streaming system 100 discussed with respect to FIG. 1.

Figure 3:
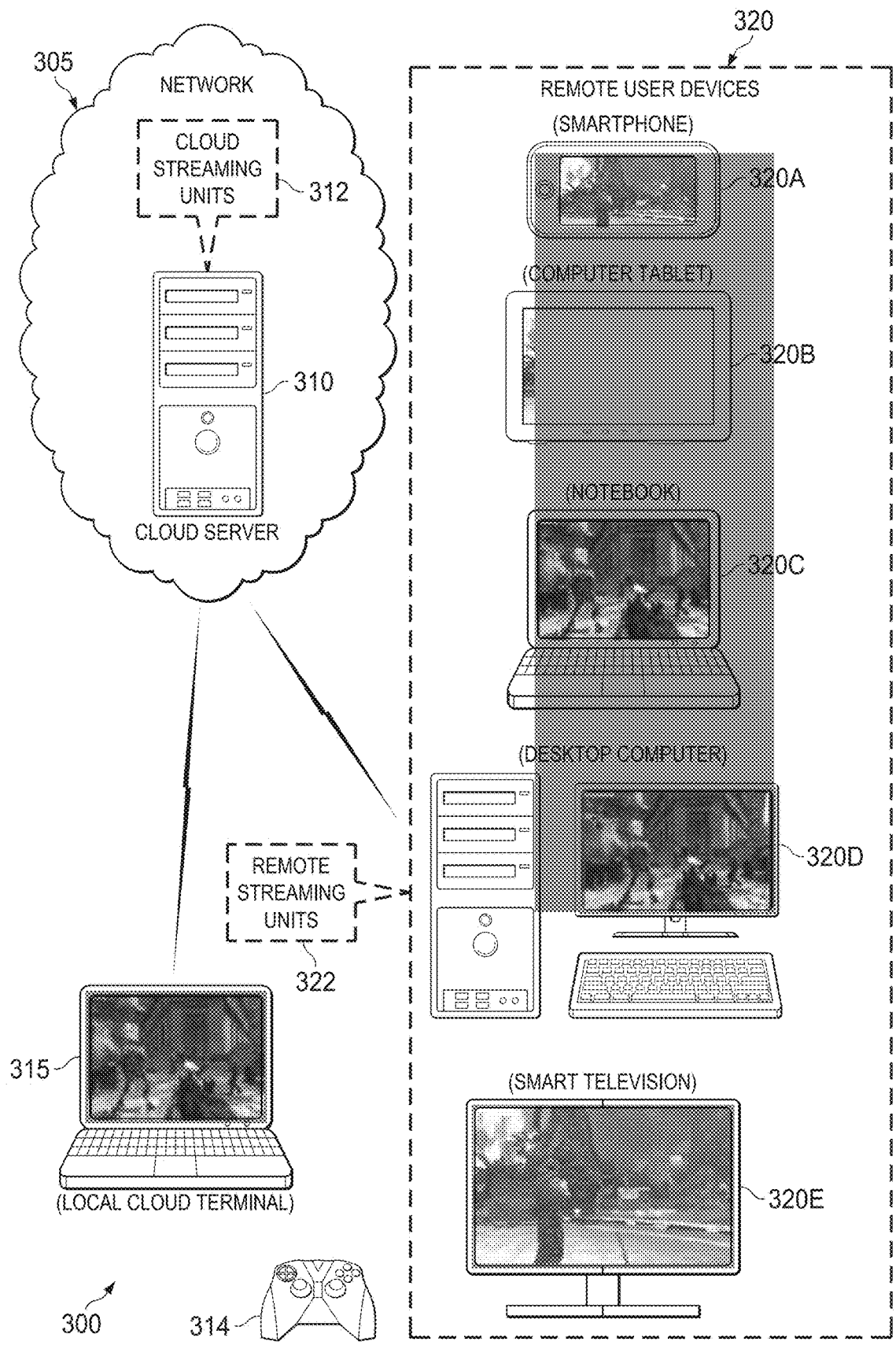
FIG. 3 illustrates a cloud server streaming arrangement employing a computer streaming system and constructed according to the principles of the present disclosure.

FIG. 3 illustrates a cloud server streaming arrangement, generally designated 300, employing a computer streaming system and constructed according to the principles of the present disclosure. The cloud server streaming arrangement 300 is typically employed to transfer viewing of a computer application from a cloud server to a remote computing or display device.

The streaming arrangement 300 includes a network 305, a cloud server 310, a local cloud terminal 315, and remote user devices 320. The network 305 is representative of a public or private network that supports communication between the cloud server 310, the local cloud terminal 315, and the remote user devices 320. The network 305 may employ wireless or wireline connections and generally may include the Internet, a cellular communications network or a WI-FI network, for example. The local cloud terminal 315 is employed by a local user to provide general set-up and streaming instructions to the cloud server 310 and to receive general or specific information from the cloud server 310. In this example, the remote user devices 320 include a smartphone 320A, a computer tablet 320B, a notebook computer 320C, a desk top computer 320D, and a smart television 320E as an example of a living room device. As before, a controller 314 may be employed to facilitate operation of at least a portion of the remote user devices 310 (e.g., the computer tablet 310B and the smart television 310E).

The streaming arrangement 300 also includes a computer streaming system, which has cloud streaming units 312 and remote streaming units 322 that employ the network 305. In the illustrated embodiment, the cloud streaming units 312 are coupled to the cloud server 310 and the remote streaming units 322 are coupled to the remote user devices 320. Generally, the cloud streaming units 312 include application hints and sending units, and typically include update units. Correspondingly, the remote streaming units 322 generally include receiving and hints processing units and typically include feedback units.

In the embodiment illustrated, the cloud streaming units 312 may be included within the cloud server 310 and may generally consist of software or hardware portions. Similarly, the remote streaming units 322 may be included within the remote user devices 320 and may generally consist of software or hardware portions, as well. In other embodiments, the cloud streaming units 312 or the remote streaming units 322 may be implemented separately from the cloud server 310 or the remote user devices 320, respectively. As before, operation of the computer streaming system included in the streaming arrangement 300 parallels that of the computer streaming system 100 discussed with respect to FIG. 1.

Figure 4:
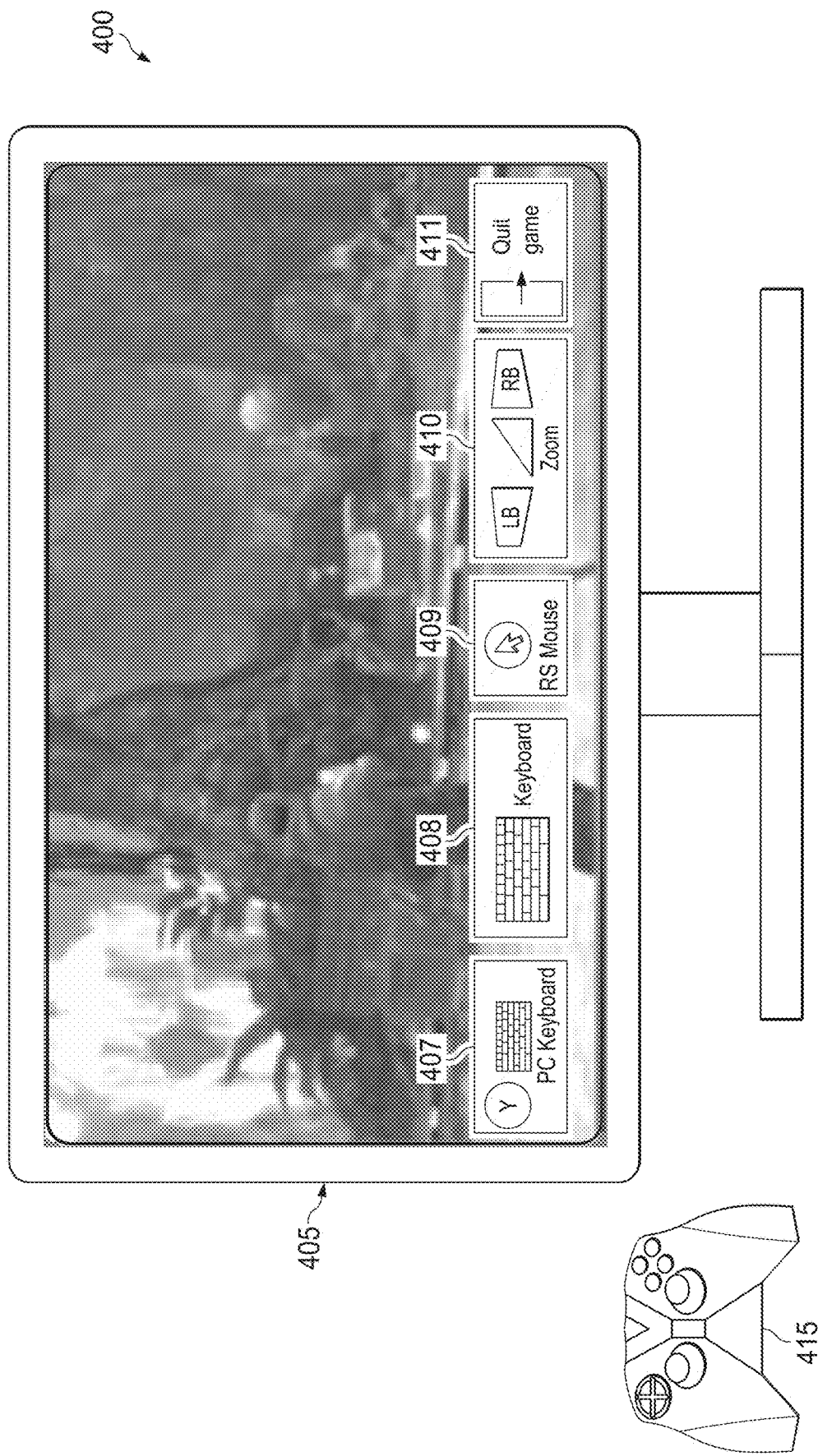
FIG. 4 illustrates an example of an end user arrangement constructed according to the principles of the present disclosure.

FIG. 4 illustrates an example of an end user arrangement, generally designated 400, constructed according to the principles of the present disclosure. The end user arrangement 400 includes a smart television 405 and a game controller 415, which is generally employed to control gameplay on the smart television 405. The smart television 405 may be employed to receive a streaming application and associated advisory hints from a streaming device. Accordingly, the game controller 415 may be employed to respond to the advisory hints while employing the streaming application.

A set of advisory icons (407-410) are shown that include a PC keyboard 407, an on-screen (virtual) keyboard 408, a virtual mouse 409, and a screen zoom control 410. A game-related icon 411 is also shown that may be employed to quit playing the game.

Each of the advisory icons (407-410) may be selected to respond to input requirements generated by an advisory hint. For example, the PC keyboard 407 is selected if needed to respond, and there is a hardware keyboard available that is coupled to the smart television 405. If the hardware keyboard is not available, the on-screen keyboard 408, which is controlled by the game controller 415, may be selected to respond. Similarly, the virtual mouse 409, also controlled by the game controller 415, may be selected, as needed. The screen zoom control 410 may be selected by the game controller 415 when enlarging or reducing a screen image display size is required to respond.

Figure 5A:
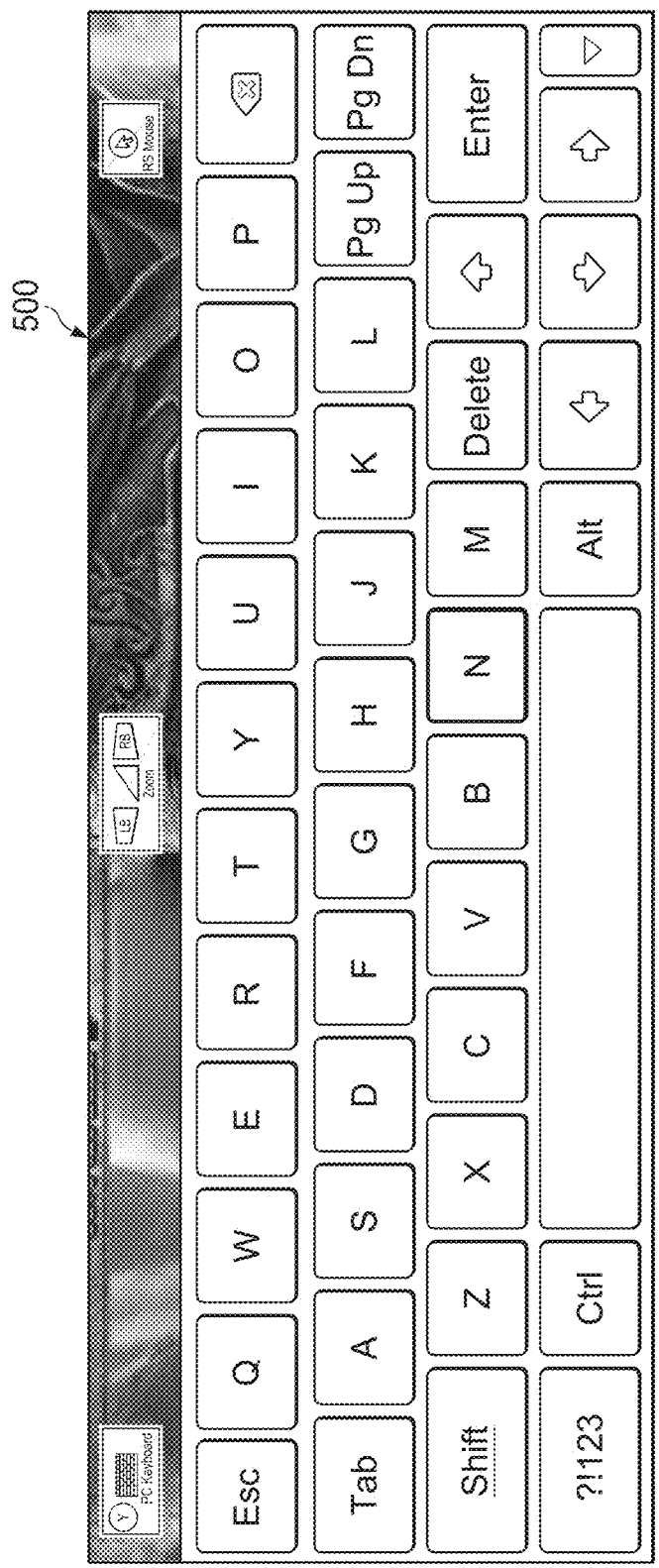
FIGS. 5A, 5B, 5C illustrate examples of on-screen keyboards that may be employed with an end user arrangement such as that of FIG. 4.
Figure 5B:
Figure 5C:

FIGS. 5A, 5B, 5C illustrate examples of on-screen keyboards, generally designated 500, 510, 515, that may be employed with an end user arrangement such as that of FIG. 4. The on-screen keyboards 500, 510, 515 are respectively employed for a response generation requiring alphabets, numbers or symbols and other functions, respectively.

Figure 6:
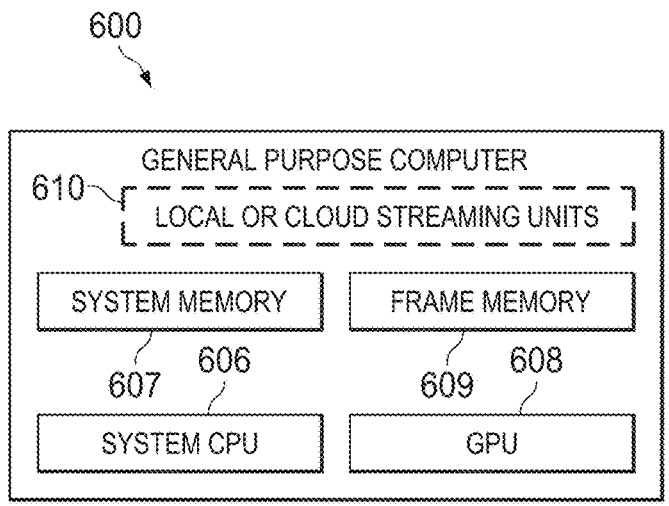
FIG. 6 illustrates a block diagram of an embodiment of a general purpose computer constructed according to the principles of the present disclosure.

FIG. 6 illustrates a block diagram of an embodiment of a general purpose computer, generally designated 600, constructed according to the principles of the present disclosure. The general purpose computer 600 may be employed as a local user device or as a cloud server as shown in the embodiments of FIGS. 2 and 3, respectively. The general purpose computer 600 may typically accommodate a wide variety of computer application software, although a computer gaming application is indicated above. The general purpose computer 600 is capable of streaming display rendering information for a remote user device when a computer application is to be streamed to the remote user device for its use there.

The general purpose computer 600 includes a system central processing unit (CPU) 606, a system memory 607, a graphics processing unit (GPU) 608, and a frame memory 609. The general purpose computer 600 also includes local or cloud streaming units 610, depending on its use. Generally, the local or cloud streaming units 610 are employed by the general purpose computer 600 to provide advisory hints for a remote user device that correspond to a selected computer application and manage streaming of the advisory hints over a network connected to the remote user device.

The system CPU 606 is coupled to the system memory 607 and the GPU 508 to provide general computing processes and control of operations for the general purpose computer 600. The system memory 607 includes long term memory storage (e.g., a hard drive) for computer applications and random access memory (RAM) to facilitate computation by the system CPU 606. The GPU 608 is further coupled to the frame memory 509 to provide display and frame control information.

The local or cloud streaming units 610 are generally indicated in the general purpose computer 600, and in one embodiment, include a software module that may correspond to software included with a computer application or software that is independent of the computer application. The local or cloud streaming units 610 may operationally reside in the system memory 607, the frame memory 609, or in portions of both. The local or cloud streaming units 610 may alternately include a hardware portion or be totally implemented in hardware.

Figure 7:
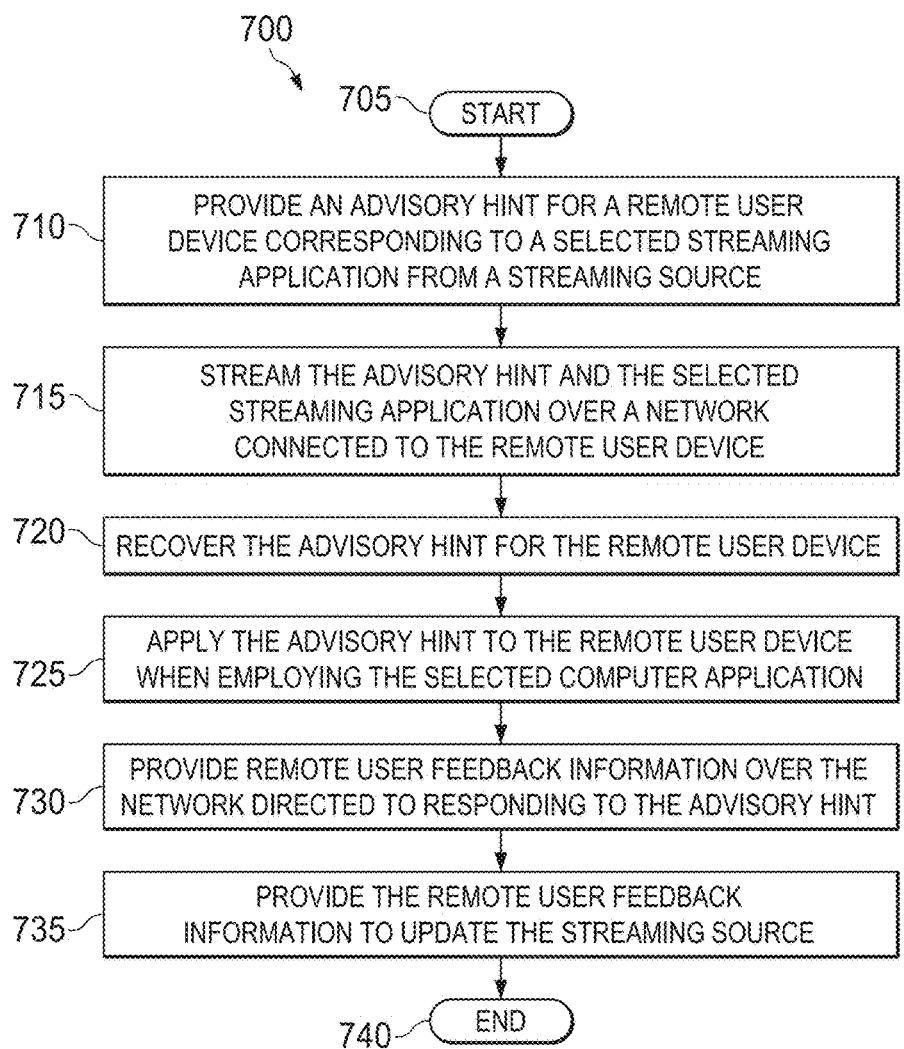
FIG. 7 illustrates a flow diagram of an embodiment of a method of streaming a computer application carried out according to the principles of the present disclosure.

FIG. 7 illustrates a flow diagram of an embodiment of a method of streaming a computer application, generally designated 700, carried out according to the principles of the present disclosure. The method 700 starts in a step 705, and then in a step 710, an advisory hint is provided for a remote user device corresponding to a selected streaming application from a streaming source. The advisory hint and the selected streaming application are streamed over a network connected to the remote user device, in a step 715. The advisory hint is recovered for the remote user device, in a step 720, and the advisory hint is applied to the remote user device when employing the selected computer application, in a step 725. Remote user feedback information is provided over the network directed to responding to the advisory hint, in a step 730, and the remote user feedback information is provided to update the streaming source, in a step 735.

In one embodiment, providing the advisory hint includes notification of an event that requires a keyboard or a mouse operation. Correspondingly, the keyboard or the mouse operation is an on-screen keyboard or an on-screen mouse operation. In another embodiment, providing the advisory hint includes notification of an event that requires zooming in or zooming out of the selected streaming application. In an additional embodiment, providing the advisory hint includes notification of an event that requires mapping of a remote client control device to provide a keyboard or a mouse operation for the remote user device or the streaming source.

In a further embodiment, the streaming source is selected from the group consisting of a local user device and a cloud server. In a still further embodiment, the remote user device is selected from the group consisting of a computer tablet, a smartphone, a notebook computer, a desk top computer, and a living room device. In yet a further embodiment, the network includes one selected from the group consisting of a WI-FI network, the Internet, and a cellular communications network. The method 700 ends in a step 740.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A computer streaming system, comprising:
   a remote user device; and
   a host streaming unit to determine one or more input methods suitable for the remote user device to interact with content being streamed using a selected application to the remote user, and to detect whether a user interface of the selected application is supported by the remote user device,
   wherein the host streaming unit dynamically institutes emulated native input support for the remote user device when the host streaming unit detects that the user interface of the selected application is not supported by the remote user device, and dynamically dismisses the emulated native input support for the remote user device when the host streaming unit detects that the user interface of the selected application is supported by the remote user device.

2. The system of claim 1, wherein, the host streaming unit dynamically dismissing the emulated native input support for the remote user device causes the remote user device to return to native input control.

3. The system of claim 1, wherein the host streaming unit comprises an application hints unit that provides an advisory hint to the remote user device corresponding to a selected streaming application, and wherein the remote user device comprises a hints processing unit to apply the advisory hint from the host streaming unit to the remote user device when employing the selected application such that the determined input method is used by the remote user device.

4. The system as recited in claim 3, wherein the remote user device does not natively support at least one of a keyboard or a mouse and the advisory hint includes notification of an event that requires the at least one of a keyboard or a mouse.

5. The system as recited in claim 4, wherein emulated native support is dynamically instituted in the remote user device by the host streaming device for at least one of an on-screen keyboard or an on-screen mouse in response to the notification.

6. The system as recited in claim 3, wherein the advisory hint includes notification of an event that requires zooming in or zooming out of the selected streaming application.

7. The system as recited in claim 3, wherein the advisory hint includes notification of an event that requires mapping a remote client control device to provide at least one of an on-screen keyboard or an on screen-mouse for the remote user device or the host streaming unit.

8. The system as recited in claim 3, further comprising a feedback unit that is coupled to the remote user device to provide remote user feedback information directed to responding to the advisory hint.

9. The system as recited in claim 8, further comprising an update unit that is coupled to the host streaming unit to provide the remote user feedback information.

10. The system as recited in claim 1, wherein the host streaming unit is selected from the group consisting of:
    a local user device; and
    a cloud server.

11. The system as recited in claim 1, wherein the remote user device is selected from the group consisting of:
    a computer tablet;
    a smartphone;
    a notebook computer;
    a desktop computer; and
    a display device.

12. A method of streaming a computer application, comprising:
    determining, by a host streaming unit, one or more input methods suitable for a remote user device for content being streamed in the computer application to the remote user device;
    detecting, by the host streaming unit, whether a user interface of the computer application is supported by the remote user device; such that:
        dynamically instituting, by the host streaming unit, emulated native input support for the remote user device when the remote user device does not support the user interface of the computer application; and
        dynamically dismissing, by the host streaming unit, the emulated native input support for the remote user device when the remote user device supports the user interface of the computer application, wherein the dynamically dismissing causes the remote user device to return to native input control.

13. The method as recited in claim 12, further comprising providing an advisory hint to the remote user device, the advisory hint including a notification of an event that requires at least one of a keyboard or a mouse operation.

14. The method as recited in claim 13, wherein the at least one of a keyboard or a mouse operation is at least one of an on-screen keyboard or an on-screen mouse operation.

15. The method as recited in claim 13, wherein providing the advisory hint includes providing notification of an event that requires a zoom operation of the application.

16. The method as recited in claim 13, wherein providing the advisory hint includes providing notification of an event that requires mapping of a remote client control device to provide a keyboard or a mouse operation for the remote user device or the host streaming unit source.

17. The method as recited in claim 13, further comprising providing remote user feedback information directed to responding to the advisory hint.

18. The method as recited in claim 17, further comprising providing the remote user feedback information to update the streaming source.

19. The method as recited in claim 12, wherein the streaming unit is selected from the group consisting of:
- a local user device; and
- a cloud server.

20. The method as recited in claim 12, wherein the remote user device is selected from the group consisting of:
- a computer tablet;
- a smartphone;
- a notebook computer;
- a desktop computer; and
- a display device.

* * * * *